United States Patent
Zhang et al.

(10) Patent No.: US 12,221,520 B2
(45) Date of Patent: Feb. 11, 2025

(54) LOW-TEMPERATURE SUPERCRITICAL FOAMING PROCESS

(71) Applicant: Fujian Xingxun New Materials Technolgy Co., Ltd, Fujian (CN)

(72) Inventors: Xiaohai Zhang, Fujian (CN); Wentao Zhai, Fujian (CN)

( * ) Notice: Subject to any disclaimer, the term of this patent is extended or adjusted under 35 U.S.C. 154(b) by 778 days.

(21) Appl. No.: 17/442,604

(22) PCT Filed: Mar. 6, 2020

(86) PCT No.: PCT/CN2020/078154
§ 371 (c)(1),
(2) Date: Sep. 23, 2021

(87) PCT Pub. No.: WO2021/103340
PCT Pub. Date: Jun. 3, 2021

(65) Prior Publication Data
US 2022/0185981 A1 Jun. 16, 2022

(30) Foreign Application Priority Data
Nov. 26, 2019 (CN) .......................... 201911172773.7

(51) Int. Cl.
*C08J 9/36* (2006.01)
*B29C 44/34* (2006.01)
*C08J 9/12* (2006.01)

(52) U.S. Cl.
CPC ................. *C08J 9/122* (2013.01); *C08J 9/36* (2013.01); *C08J 2203/06* (2013.01); *C08J 2203/08* (2013.01); *C08J 2205/052* (2013.01); *C08J 2323/06* (2013.01); *C08J 2323/08* (2013.01); *C08J 2323/12* (2013.01); *C08J 2367/00* (2013.01); *C08J 2375/04* (2013.01); *C08J 2377/00* (2013.01)

(58) Field of Classification Search
CPC . C08J 9/122; C08J 9/36; C08J 2203/06; C08J 2203/08; C08J 2205/052; C08J 2323/06; C08J 2323/08; C08J 2323/12; C08J 2367/00; C08J 2375/04; C08J 2377/00; C08J 2201/026; C08J 2201/032; C08J 2300/22; C08J 2300/26; B29C 44/348; B29C 44/3453; B29K 2021/003; B29K 2023/00; Y02P 20/10
See application file for complete search history.

(56) References Cited

FOREIGN PATENT DOCUMENTS

CN    104987525 A  *  10/2015
EP     06140953 A  *   8/1994

* cited by examiner

*Primary Examiner* — K. Boyle

(57) ABSTRACT

Disclosed is a low-temperature supercritical foaming process, comprising the following steps: (1) bringing a polyolefin material or a thermoplastic elastomer material into contact with at least one inert gas in a reactor at a pressure higher than atmospheric pressure to drive the gas into the material, the pressure holding temperature of the polyolefin material or thermoplastic elastomer material being lower than the melting temperature of the material by 5-40° C.; (2) reducing the pressure to expand the material so as to produce a primary foamed material, and taking out the primary foamed material; and (3) taking out the primary foamed material and putting same into a tunnel furnace for secondary foaming, the temperature of the tunnel furnace being higher than the melting temperature of the material. Compared with the prior art, the present invention features high production efficiency, energy saving, and improvement of the reactor utilization rate.

9 Claims, No Drawings

LOW-TEMPERATURE SUPERCRITICAL FOAMING PROCESS

BACKGROUND OF THE INVENTION

The invention relates to the field of supercritical foaming technology, in particular to a low-temperature supercritical foaming technology, which can greatly improve the utilization rate of a reactor, and make the product have the characteristics of uniform foaming ratio and high consistent performance.

The licensed Chinese patent of ZL200580013302.3 discloses a fluoropolymer foam and its preparation method and application. The method includes the following steps: (a) contacting the fluoropolymer resin with at least one inert gas at a pressure higher than atmospheric pressure with aim to drive the gas into the resin, (a1) increase the temperature of the resin up to or above its softening point, wherein steps (a) and (a1) can occur in any order or simultaneously, and (b) while maintaining the temperature at or above the softening point of the resin, reducing the pressure to expand the resin to produce a closed-cell fluoropolymer foam, wherein the resin is crosslinked before expansion.

The key creativity of the above-mentioned patent is to contact the fluoropolymer resin with inert gas at high temperature and high pressure, allowing the fluoropolymer resin to absorb a certain amount of gases, reduce the pressure at a temperature higher than the softening point of the resin, so then produce the fluoropolymer foam with the closed-cells and uniform cell size distribution.

However, in the actual operation process of the above method, it is found that at least the following shortcomings exist:

1. Since the entire process is basically operated at a temperature exceeding the softening point of the resin, that is, when the resin is expanded, the resin will be fully expanded in the autoclave directly. In order to provide enough expansion space for the resin, it has to increase the gap between adjacent. Due to the volume of the autoclave is limited, the increased gap will reduce the number of loaded resins and thus reduce the utilization efficiency of the reactor.

2. In the whole process, the temperature needs to be increased beyond the softening point of the resin, and in the process of depressurizing the reactor, since most of the hot gas has already released, the gas needs to be reheated every time. The heating time is relatively long, which greatly reduces the production efficiency, and the repeated heating and gas release process will cause a lot of heat waste and cause environmental pollution. Under the increasingly severe environmental protection requirements, the operation is very troublesome.

In view of this, the applicant focused on the above-mentioned problems, and this case was created.

BRIEF SUMMARY OF THE INVENTION

The main purpose of the present invention is to provide a low-temperature supercritical foaming process to solve the problems of low autoclave utilization efficiency and large heat waste in the prior art.

In order to achieve the above objective, the solution of the present invention is creating a low-temperature supercritical foaming process, which includes the following steps:

Step 1: Use polyolefin materials or thermoplastic elastomer materials to contact at least one inert gas in a autoclave at a pressure higher than atmospheric pressure to drive the gas into the material; The saturation temperature of the polyolefin-based material or the thermoplastic elastomer-based material is 5-40° C. lower than the melting temperature of the material;

Step 2: Release the pressure to expand the material, and the foamed material is taken out the autoclave;

Step 3: Put the foamed material into a tunnel furnace for the secondary foaming, where the temperature of the tunnel furnace is higher than the melting temperature of the material.

In the step 3, the temperature of the tunnel furnace is 10-40° C. higher than the melting temperature of the material, and the secondary foaming time is 5-60 minutes.

In the step 1, the polyolefin material is one of PE, PP or EVA materials or a mixture of two or more; the thermoplastic elastomer material is one of TPE, TPU, TPEE or PEBAX or a mixture of two or more materials.

In the step 1, the polyolefin-based material or the thermoplastic elastomer-based material is cross-linked by a cross-linking agent, or cross-linked by irradiation.

In the step 1, at least one inert gas is a supercritical fluid, which is nitrogen, carbon dioxide or a mixed gas of the two, and saturation pressure is 10-70 MPa.

Further, the saturation pressure is 50-70 MPa.

In the step 1, the saturation temperature is 5-10° C. lower than the melting temperature of the material.

In the step 1, the saturation time is 0.5-24 hours.

In the step 2, the pressure release is achieved by exhausting, and the exhausting speed is 5 s-600 s.

The present invention relates to a low-temperature supercritical foaming process. Compared with the prior art, the present invention has at least the following benefits:

1. In the present invention, the saturation temperature of the polyolefin material or thermoplastic elastomer material in the autoclave is 5-40° C. lower than the melting temperature of the material, that is, the foamed polyolefin material or thermoplastic elastomer material still have much inert gas in their matrix. Meanwhile, the expansion of the foamed materials within the autoclave is not very much, and thus the more materials can be packed inside. The strategy is benefit for the increase of utilization efficiency of the autoclave and decrease the cost of production.

2. The present invention uses a tunnel furnace to carry out the secondary foaming. The residence of inert gas within the first foamed material can be used for the secondary foaming. During the secondary foaming within the tunnel furnace, the higher the temperature of the tunnel furnace, the larger the expansion ratio of foams. The secondary foaming time of the entire tunnel furnace can be set according to the thickness of the material. The thicker the material, the longer the time.

3. The present invention uses a tunnel furnace for the secondary foaming, which has the characteristics of continuous foaming, uniform temperature, uniform foaming ratio, good performance consistency, time controllable, and cost effective.

4. The autoclave has a relatively low temperature, and it can keep a constant temperature during the whole process, which greatly save energy and reduce production costs.

DETAILED DESCRIPTION OF THE INVENTION

To further explain the technical solution of the present invention, the present invention is explained in detail through the following specific embodiments.

The present invention relates to a low-temperature supercritical foaming process, which includes the following steps:

Step 1: Saturate polyolefin materials or thermoplastic elastomer materials by at least one inert gas in an autoclave at a pressure higher than atmospheric pressure to drive the gas into the material;

The saturation temperature of the polyolefin-based material or thermoplastic elastomer-based material is 5-40 C lower than the melting temperature of the material, preferably 5-10 C lower than the melting temperature of the material;

Step 2: Release the pressure to foam the material, and produce a foamed material and take out the foamed material;

Step 3: Take out the primary foaming material and put it into a tunnel furnace for secondary foaming, where the temperature of the tunnel furnace is higher than the melting temperature of the material.

In this way, in the present invention, the saturation temperature of the polyolefin material or thermoplastic elastomer material in the autoclave is 5-40° C. lower than the melting temperature of the material, that is, there is lots of inert gas being retained inside the material after the material is reduced in pressure to complete a foaming. Just because of the residual of a large amount of inert gas within the matières, the materials cannot expand too much with the autoclave. Therefore, in the same space in the autoclave, more materials can be placed, and thereby improving the utilization efficiency and reduces the processing cost.

Secondly, the present invention uses a tunnel furnace to perform secondary foaming. The main purpose is to cooperate with the previous two steps to perform secondary foaming of the material that retains the inert gas, that is, to allow the inert gas inside the material to be released, and to achieve the purpose of secondary foaming. As a specific example, in the step 3, the temperature of the tunnel furnace is 10-40° C. higher than the melting temperature of the material, and the secondary foaming time is 5-60 minutes; During the secondary foaming process within the tunnel furnace, the higher the temperature of the tunnel furnace, the greater the foaming ratio. The secondary foaming time of the entire tunnel furnace can be set according to the thickness of the material, and the thicker the material, the longer the time.

The invention uses a tunnel furnace for secondary foaming, which has the characteristics of continuous foaming, uniform temperature, uniform foaming ratio, good performance consistency, time controllable, low-temperature pressure and high space utilization rate. Meanwhile, the whole process has high efficiency and low cost.

Because the temperature of the autoclave is relatively low, the autoclave is always in a constant temperature during the process, which can greatly save energy and reduce production costs.

In the present invention, the polyolefin material in the step 1 is one or a mixture of two or more materials of PE, PP or EVA; the thermoplastic elastomer material in the step 1 is TPE, TPU. TPEE, PEBAX or a mixture of two or more materials.

Preferably, the polyolefin-based material or the thermoplastic elastomer-based material in step 1 is cross-linked by a cross-linking agent, or irradiated, or the cross-linking operation may not be performed.

In the present invention, at least one inert gas in step 1 is a supercritical fluid, which is nitrogen, carbon dioxide, or a mixed gas of the two, and its saturation pressure is 10-70 MPa, preferably 50-70 MPa.

It should be noted that the saturation time in step 1 is 0.5-24 hours, and the specific holding time is determined according to the thickness of the material.

The higher the material thickness, the longer the holding time.

In the step 2, the pressure is released by quenching, and the exhaust speed is 5 s-500 s, and the pressure is released to the atmospheric pressure at a time within this time period. The faster the speed, the finer the cells, while the slower the speed, the larger the cells are. The exhaust speed can be adjusted according to actual needs during production.

The foregoing embodiments do not limit the product form and style of the present invention, and any appropriate changes or modifications made by those of ordinary skill in the art should be regarded as not departing from the patent scope of the present invention.

What is claimed is:

1. A low-temperature supercritical foaming process, characterized in that it comprises the following steps:

step 1: saturation of a polyolefin-based material or a thermoplastic elastomer-based material, at a saturation temperature, by at least one inert gas in an autoclave at a pressure higher than atmospheric pressure to drive the gas into the polyolefin-based material or the thermoplastic elastomer-based material;

wherein the saturation temperature of the polyolefin-based material or the thermoplastic elastomer-based material is 5 to 40° C. lower than the melting temperature of the polyolefin-based material or the thermoplastic elastomer-based material;

step 2: release the pressure to foam the polyolefin-based material or the thermoplastic elastomer-based material, thereby forming a primary foamed polyolefin-based material or a primary foamed thermoplastic-elastomer material, and taking the primary foamed polyolefin-based material or the primary foamed thermoplastic-elastomer material out of the autoclave;

step 3: placing the primary foamed polyolefin-based material or the primary foamed thermoplastic-elastomer material into a tunnel furnace for a secondary foaming, wherein a temperature of the secondary foaming in the tunnel furnace is higher than the melting temperature of the polyolefin-based material or the thermoplastic elastomer-based material.

2. The low-temperature supercritical foaming process according to claim 1, wherein the temperature of the tunnel furnace in step 3 is 10 to 40° C. higher than the melting temperature of the polyolefin-based material or the thermoplastic elastomer-based material, and the secondary foaming occurs for a time of 5 to 60 minutes.

3. The low-temperature supercritical foaming process according to claim 1, wherein the polyolefin-based material is one of PE, PP or EVA, or a mixture of two or more of these, and the thermoplastic elastomer-based material is one of TPE, TPU, TPEE or a mixture of two or more of these.

4. The low-temperature supercritical foaming process according to claim 1 or 3, characterized in that the polyolefin-based material or the thermoplastic elastomer-based material in step 1 is crosslinked by a crosslinking agent, or by irradiation.

5. The low-temperature supercritical foaming process according to claim 1, wherein the at least one inert supercritical fluid gas is nitrogen, carbon dioxide, or a mixture thereof, and the pressure during saturation is from 10 to 70 MPa.

6. The low-temperature supercritical foaming process according to claim 5, wherein the pressure during saturation is from 50 to 70 MPa.

7. The low-temperature supercritical foaming process according to claim 1, wherein the saturation temperature in step 1 is 5 to 10° C. lower than the melting temperature of the polyolefin-based material or the thermoplastic elastomer-based material.

8. The low-temperature supercritical foaming process according to claim 1, wherein the pressure higher than atmospheric pressure is held for a time of 0.5 hour to 24 hours.

9. The low-temperature supercritical foaming process according to claim 1, wherein the release of pressure in step 2 is achieved by quenching, and a quenching speed is 5 s to 600 s.

\* \* \* \* \*